US012757279B2

(12) United States Patent
Kinoshita

(10) Patent No.: US 12,757,279 B2
(45) Date of Patent: Oct. 6, 2026

(54) INFORMATION PROCESSING SYSTEM, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Yosuke Kinoshita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/519,264

(22) Filed: Nov. 27, 2023

(65) Prior Publication Data

US 2024/0414798 A1 Dec. 12, 2024

(30) Foreign Application Priority Data

Jun. 7, 2023 (JP) ................................ 2023-094017

(51) Int. Cl.
*H04W 76/10* (2018.01)
*H04L 67/10* (2022.01)
*H04W 76/20* (2018.01)

(52) U.S. Cl.
CPC ............. *H04W 76/20* (2018.02); *H04L 67/10* (2013.01); *H04W 76/10* (2018.02)

(58) Field of Classification Search
CPC ............................... H04W 76/10; H04L 67/10
USPC .......................................................... 370/310
See application file for complete search history.

(56) References Cited

FOREIGN PATENT DOCUMENTS

| | | | | |
|---|---|---|---|---|
| JP | 2015060359 A * | 3/2015 | ........... | G06Q 20/327 |
| JP | 2019-160082 A | 9/2019 | | |
| WO | WO-2023140069 A1 * | 7/2023 | ............ | H04W 4/023 |

* cited by examiner

*Primary Examiner* — Sibte H Bukhari
(74) *Attorney, Agent, or Firm* — Oliff PLC

(57) ABSTRACT

An information processing system includes a processor configured to manage multiple second information processing apparatuses to be paired with first information processing apparatus retaining data, the multiple second information processing apparatuses retaining data synchronized with data retained by first information processing apparatus, and the processor being configured to, in response to request for pair re-formation from the first information processing apparatus with one of the multiple second information processing apparatuses, request that each of multiple second information processing apparatuses perform confirmation of existence of first information processing apparatus paired with second information processing apparatus, receive result of confirmation of existence, and reference the received results of the confirmation of existence and identify the second information processing apparatus that has failed to confirm existence of the first information processing apparatus paired with the second information apparatus.

11 Claims, 4 Drawing Sheets

INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2023-094017 filed Jun. 7, 2023, the entire disclosure of which is incorporated by reference herein.

BACKGROUND

(i) Technical Field

The present disclosure relates to an information processing system, an information processing method, and a non-transitory computer readable medium.

(ii) Related Art

In recent years, a technology has been known that provides a cloud service in which a multifunction peripheral, which is a real machine, operates in collaboration with a digital replica in a cloud (hereinafter, referred to as a "virtual device") corresponding to the multifunction peripheral. A user may use a service such as image processing provided by the multifunction peripheral by accessing the virtual device in the cloud without directly accessing the multifunction peripheral.

To provide the same service as provided by the multifunction peripheral, the virtual device is configured to successively synchronize with the multifunction peripheral, and the multifunction peripheral and the virtual device retain the same data or the data corresponding to each other. Synchronization starts in response to an inquiry sent by the multifunction peripheral to the virtual device about updates.

For such a service system, a technology is known that checks the authenticity of a device by using a public key and a private key to prevent "spoofing" by a bogus device. More specifically, a multifunction peripheral (hereinafter, also referred to as a "real device") retains its own private key and causes a virtual device to retain a public key of the multifunction peripheral, and the public key is associated with the private key (the public key and the private key are referred to as a "key pair", hereinafter). A different key pair is usually created and used for each device in most cases to minimize an area of influence in case of leakage.

In contrast to inexpensive small-sized devices, multifunction peripherals are normally used for a long period of time without renewal through maintenance operations performed in case of a malfunction or a failure, and such maintenance operations include a return to the initial state prior to shipment from the factory, replacement of a board, and replacement by the same type of machine. In such a case, for example, if a board that stores a private key is replaced, the pair is dissolved that was formed by the real device paired with the virtual device based on the key pair. Thus, after the maintenance operation, the real device sends a public key of a new key pair to a server that is located in the cloud and that is designated to manage virtual devices, and the real device requests that the server re-form a pair based on the new key pair. Subsequently, the real device is paired again with a virtual device retaining the public key of the new key pair and thereafter synchronizes data with the virtual device paired with the real device.

An example of the related art is disclosed in, for example, Japanese Unexamined Patent Application Publication No. 2019-160082.

SUMMARY

When there are multiple second information processing apparatuses retaining data synchronized with the data retained by a first information processing apparatus and a pair was dissolved that was formed by one of the multiple second information processing apparatuses paired with the first information processing apparatus, it may be helpful to identify the second information processing apparatus that was paired with the first information processing apparatus. This is because, for example, when the first information processing apparatus that dissolved a pair is paired again with a second information processing apparatus, it is more efficient to transfer and hand over, to the second information processing apparatus to be paired, the synchronized data and other settings retained by the second information processing apparatus that was paired with the first information processing apparatus until the dissolution of the pair, rather than providing all the data and the configuration settings to be synchronized to the second information processing apparatus to be paired.

Aspects of non-limiting embodiments of the present disclosure relate to, in managing the second information processing apparatuses retaining data synchronized with the data retained by the first information processing apparatus, in response to a request for pair re-formation from the first information processing apparatus that ceased to be paired with the second information processing apparatus, identifying the second information processing apparatus that was paired with the first information processing apparatus among multiple second information processing apparatuses.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to manage a plurality of second information processing apparatuses to be paired with a first information processing apparatus retaining data, the plurality of second information processing apparatuses retaining data synchronized with the data retained by the first information processing apparatus, wherein the processor is configured to: in response to a request for pair re-formation from the first information processing apparatus that has ceased to be paired with one of the plurality of second information processing apparatuses, request that each of the plurality of second information processing apparatuses perform confirmation of existence of the first information processing apparatus paired with the second information processing apparatus; receive a result of the confirmation of existence returned by each of the plurality of second information processing apparatuses in response to the request for the confirmation of existence; and if the first information processing apparatus that made the request for pair re-formation is referred to as a requester and the second information processing apparatus that was paired with the requester is referred to as an immediately preceding pairing partner, reference the received results of the confirmation of existence and identify, as the immediately preceding pairing partner, the second information processing apparatus that has failed to confirm existence of the first information processing apparatus paired with the second information apparatus.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described with reference to the drawings.

First Exemplary Embodiment

Figure 1:
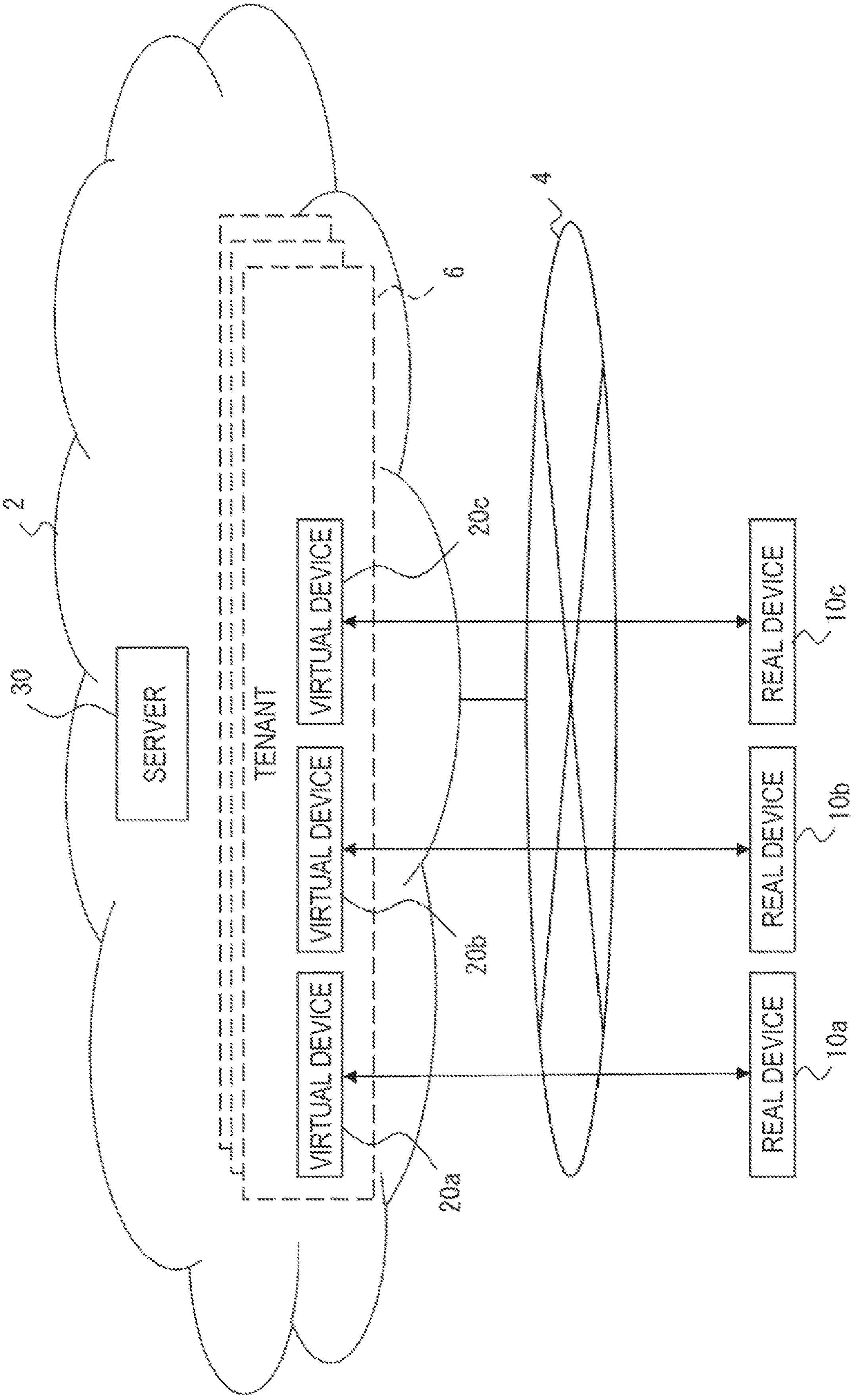
FIG. 1 depicts an overall configuration of a service system according to a first exemplary embodiment.

FIG. 1 depicts an overall configuration of a service system according to the present exemplary embodiment. The service system according to the present exemplary embodiment is an example of an information processing system according to the present disclosure. FIG. 1 depicts a configuration in which multifunction peripherals 10 installed in an on-premises environment and virtual multifunction peripherals 20 formed in a cloud 2 are connected to each other using a network 4 such as the Internet. A multifunction peripheral 10 as a first information processing apparatus is physically installed in an on-premises environment and is thus also referred to as a "real device 10" in the following description. In contrast, a multifunction peripheral 20 as a second information processing apparatus is virtually formed in the cloud 2 and is thus also referred to as a "virtual device 20" in the following description.

A real device 10 is configured to retain data to be synchronized. A virtual device 20 is a device configured to retain data synchronized with the data retained by the real device 10 and operates as a digital replica of the real device 10. A server 30 formed in the cloud 2 is configured to manage the virtual devices 20 grouped into each tenant 6.

A "tenant" 6 is a unit for managing cloud services and users who use the cloud services provided by the service system. In the tenant 6, a person who uses the tenant is referred to as a "user", and a user who exercises administrator privileges is referred to as an "administrator". Administrators are distinguished based on the privileges granted in each management range such as the entire tenant, part of the tenant, or a service.

FIG. 1 depicts real devices 10*a*, 10*b*, and 10*c* and virtual devices 20*a*, 20*b*, and 20*c* that correspond to the real devices 10*a*, 10*b*, and 10*c*, respectively. In the present exemplary embodiment, description will be given on the assumption that there is a one-on-one association between the real devices 10 and the virtual devices 20, but multiple real devices 10 may be associated with a single virtual device 20. In FIG. 1, three sets of devices are depicted, but two or more sets may be formed in the present exemplary embodiment. When the real devices 10*a*, 10*b*, and 10*c* need not be distinguished from each other, each device is referred to as the "real device 10" as above. The virtual devices 20*a*, 20*b*, and 20*c* are also referred to in a similar manner.

The multifunction peripheral 10 according to the present exemplary embodiment is an example of an image forming apparatus having various functions such as a print function, a copy function, and a scan function and includes a built-in information processing apparatus (also referred to as a "computer"). The multifunction peripheral 10 according to the present exemplary embodiment may be implemented using a general-purpose hardware configuration known in the art. Specifically, the multifunction peripheral 10 includes a central processing unit (CPU), a read-only memory (ROM), a random-access memory (RAM), a storage unit, such as a hard-disk drive (HDD), for storing data including image data and a confidential mailbox, an operation panel as a user interface, a network interface for connecting to the network 4 such as the Internet, and components such as a scanner and a print engine necessary for providing various functions. During the life cycle of the multifunction peripheral 10, an event such as the return due to expiration of a lease agreement or exchange/disposal due to failure and maintenance occurs.

The multifunction peripheral 10 according to the present exemplary embodiment includes a hardware security module (HSM) such as a trusted platform module (TPM) as a method for storing keys. An HSM is a hardware device with an enhanced tamper-resistant function and is fixed to a board, and the HSM is configured to keep an encrypting process secure by generating, protecting, and managing keys used for data encryption and decryption and for creation of a digital signature and a certificate. In the present exemplary embodiment, a private key and a public key in the public-key cryptosystem (also referred to as "owner authentication keys") and a private key and a public key that were assigned prior to shipment and that are used to confirm the identity of the multifunction peripheral 10 (also referred to as "device authentication keys") are used as authentication keys. The owner authentication keys are provided to each of the multifunction peripherals 10. The device authentication keys may be provided to each of the multifunction peripherals 10 or may be shared, for example, in each of the tenants 6. The HSM stores the private key of the owner authentication keys and the private key of the device authentication keys.

The virtual devices 20 are each an example of a virtual image forming apparatus implemented by one or more computers and includes an information processing apparatus. The server 30 is an example of a virtual server computer implemented by one or more computers. Although the virtual devices 20 and the server 30 are described as virtual, these devices each include a CPU, a ROM, a RAM, a storage unit, and a communication unit. Each of the virtual devices 20 and the server 30 is depicted as a single device for the convenience of description but may be constructed as a combination of multiple devices.

To provide users with equivalent services using the real device 10 and the virtual device 20, data needs to be synchronized between the real device 10 and the virtual device 20. The phrase "data is synchronized" means that two devices retain basically the same data. In addition, part of the software (referred to as a "subset") present on the virtual device 20 is sometimes present on the multifunction peripheral 10. In this way, the phrase "data is synchronized" should not be construed to only mean that two devices retain exactly the same data. In the present exemplary embodiment, the phrase "data is synchronized" indicates that the multifunction peripherals 10 and 20 operate in collaboration with each other and that each is ready for providing a service to be provided using the data.

In addition, the term "data" encompasses applications, data to be used in applications, and various setting values for the multifunction peripherals 10 and 20. In summary, electronic data referenced by the multifunction peripherals 10 and 20 for operation is collectively referred to as "data" in the present exemplary embodiment. If data is an application, the data needs to be synchronized because of a version upgrade, addition of a function, and other operations.

Figure 2:
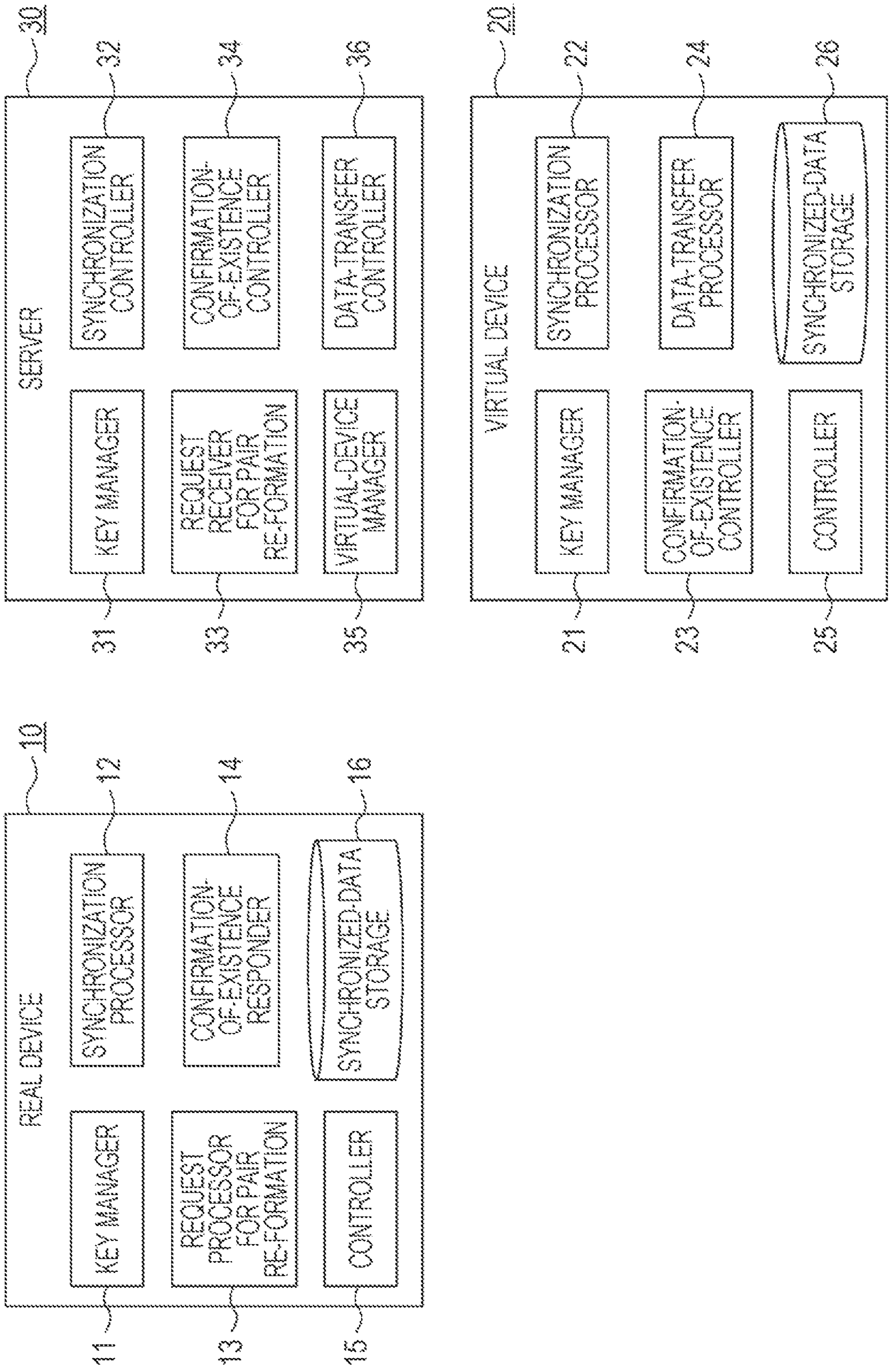
FIG. 2 depicts an example of a block diagram of the service system according to the first exemplary embodiment.

FIG. 2 depicts an example of a block diagram of the service system according to the present exemplary embodiment. The multiple real devices 10*a*, 10*b*, and 10*c* depicted in FIG. 1 include functional blocks depicted in FIG. 2 in common. The same applies to the virtual devices 20. Naturally, for example, the real device 10 is configured to provide multiple functions such as the print function and the scan function, but such functions as are not used for the description of the present exemplary embodiment are omitted from the illustration in FIG. 2.

The real device 10 includes a key manager 11, a synchronization processor 12, a request processor for pair re-formation 13, a confirmation-of-existence responder 14, a controller 15, and a synchronized-data storage 16.

The key manager 11 is implemented by the HSM described above and is configured to retain and manage the owner authentication keys and the device authentication keys. The synchronized-data storage 16 is configured to store data to be synchronized, and the synchronization processor 12 is configured to perform a synchronization process to synchronize data with a virtual device 20, which is to retain synchronized data. The request processor for pair re-formation 13 is configured to request that the server 30 pair the real device 10 with a virtual device 20 again in response to a request for re-registration of the virtual device 20 from a user after the real device 10 ceased to be paired with a virtual device 20. The confirmation-of-existence responder 14 is configured to respond that the real device 10 exists in response to an inquiry about confirmation of existence from the virtual device 20 paired with the real device 10. The controller 15 is configured to control execution by the components 11 to 14 above of the real device 10.

Each of the components 11 to 15 of the real device 10 is implemented by collaborative operation between the computer installed in the real device 10 and programs running on the CPU installed in the computer. The synchronized-data storage 16 is implemented by an HDD installed in the real device 10. Alternatively, a RAM or a storage unit located outside may be used via a network.

The virtual device 20 includes a key manager 21, a synchronization processor 22, a confirmation-of-existence controller 23, a data-transfer processor 24, a controller 25, and a synchronized-data storage 26.

The key manager 21 is configured to retain and manage the public key of the owner authentication keys. The synchronized-data storage 26 is configured to store the data that has been synchronized with the data in the real device 10, and the synchronization processor 22 is configured to perform a synchronization process to synchronize data with the real device 10, which is to retain synchronized data. The confirmation-of-existence controller 23 is configured to confirm the existence of the real device 10 paired with the virtual device 20 in response to an instruction from the server 30 and return the result of confirmation of existence to the server 30. The data-transfer processor 24 is configured to, when the virtual device 20 is newly created by the server 30 in response to a request for pair re-formation from the real device 10, acquire and take over, in response to a transfer instruction from the server 30, data to be synchronized that was retained by a virtual device 20 that was paired with the real device 10 immediately before the creation of the virtual device 20. The controller 25 is configured to control execution by the components 21 to 24 of the virtual device 20.

Each of the components 21 to 25 of the virtual device 20 is implemented by collaborative operation between the computer installed in the virtual device 20 and programs running on the CPU installed in the computer. The synchronized-data storage 26 is implemented by an HDD installed in the virtual device 20. Alternatively, a RAM or a storage unit located in the cloud 2 may be used.

The server 30 includes a key manager 31, a synchronization controller 32, a request receiver for pair re-formation 33, a confirmation-of-existence controller 34, a virtual-device manager 35, and a data-transfer controller 36.

The key manager 31 is configured to retain and manage the device authentication keys and the public key of the owner authentication keys that are sent from each of the real devices 10. The synchronization controller 32 is configured to control a synchronization process performed by the real devices 10 and the virtual devices 20. The confirmation-of-existence controller 34 is configured to, in response to a request for pair re-formation from the real device 10, request that each of the multiple virtual devices 20 in the tenant 6, to which the real device 10 belongs, confirm the existence of a real device 10 paired with the virtual device 20, and the confirmation-of-existence controller 34 is configured to collect the result of confirmation of existence returned by each of the virtual devices 20 in response to the request for confirmation of existence. The virtual-device manager 35 is configured to manage the virtual devices 20 to be managed in each of the tenants 6. The data-transfer controller 36 is configured to, when a virtual device 20 is newly created by the virtual-device manager 35 in response to a request for pair re-formation from the real device 10, perform control to transfer to the newly created virtual device 20 data to be synchronized that was retained by the virtual device 20 that was paired with the real device 10 immediately before the creation of the virtual device 20.

Each of the components 31 to 36 of the server 30 is implemented by collaborative operation between a computer constituting the server 30 and programs running on the CPU installed in the computer.

The programs used in the present exemplary embodiment may be provided not only via a communication unit but also in a stored form using a computer-readable recording medium, such as a universal-serial-bus (USB) memory. The programs provided using the communication unit or the recording medium are installed in the computer, and the CPU of the computer executes the programs consecutively to perform various processes.

Next, operation according to the present exemplary embodiment will be described. In the present exemplary embodiment, description will be given as an example with regard to a case where each of the virtual devices 20 belonging to a single tenant 6 is synchronized and paired with a real device 10 corresponding to the virtual device 20 and three such sets are formed as illustrated in FIG. 1.

As described above, a multifunction peripheral 10 and a multifunction peripheral 20 provide equivalent services. Thus, in response to an inquiry sent from the multifunction peripheral 10 to the multifunction peripheral 20 at a predetermined time, a synchronization process starts that is performed through the collaboration of the synchronization processors 12 and 22 of the multifunction peripherals 10 and 20, respectively, under the control by the synchronization controller 32 of the server 30. In the present exemplary embodiment, it is assumed that data is already synchronized between the multifunction peripherals 10 and 20.

Consider a situation in which the board of a real device 10 is replaced because of some kind of problem while the data is synchronized as above. As described above, a real device 10 and a virtual device 20 corresponding to the real device 10 are paired with each other by each retaining one of the owner authentication keys (that is, a key pair consisting of a private key and a public key) that are a pair of pieces of information that may prove that a pair is formed, and replacing the board including an HSM storing the private key of the owner authentication keys is equivalent to dissolution of the synchronized pair.

Figure 3:
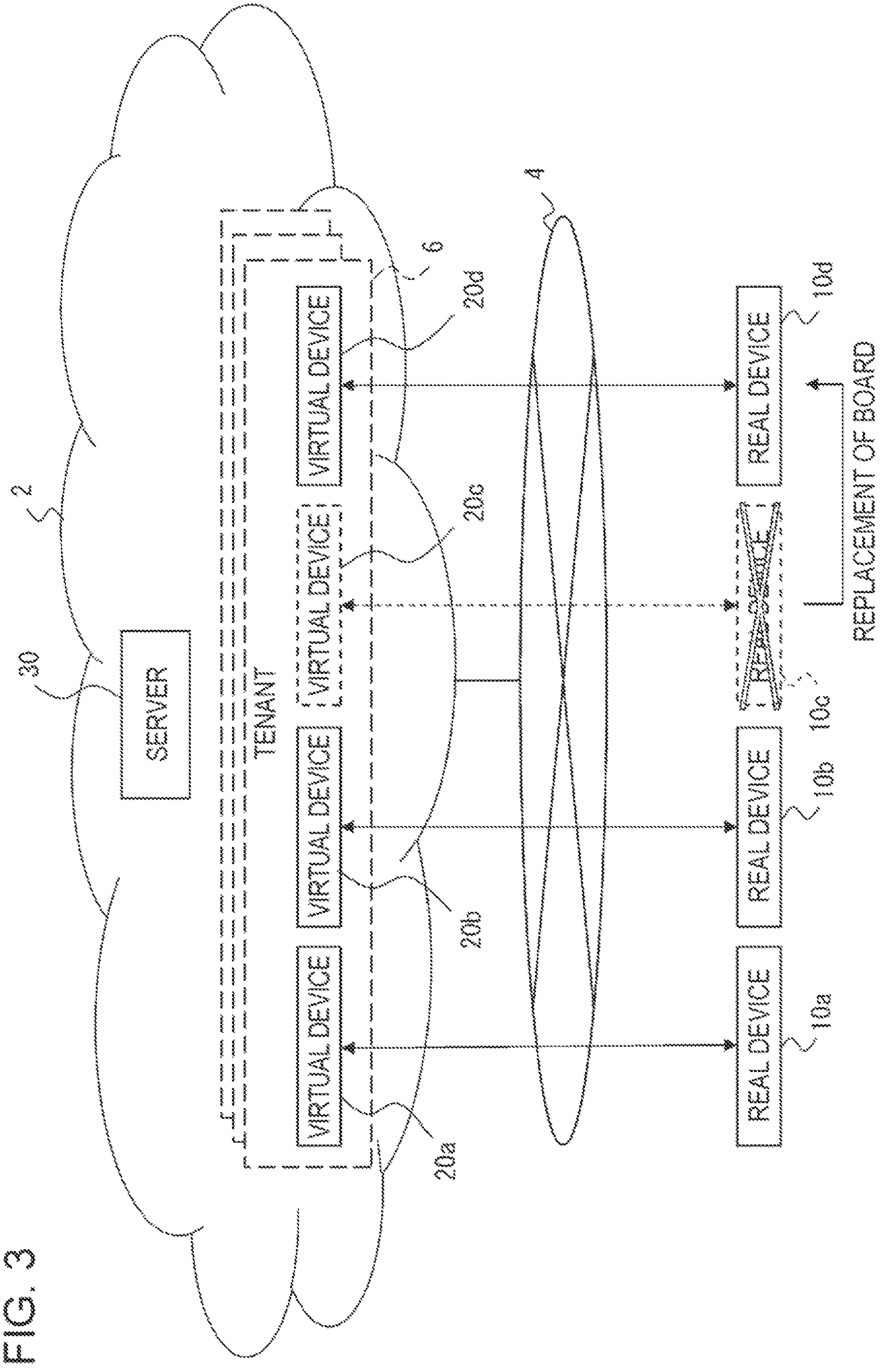
FIG. 3 depicts another overall configuration of the service system according to the first exemplary embodiment.

FIG. 3 depicts an overall configuration of the service system as FIG. 1 does, but the real device 10*c* is illustrated as a real device 10*d* in FIG. 3 because the board was replaced. Although the configuration of the body of the multifunction peripheral 10 except the board is the same as before the replacement of the board, the multifunction peripheral 10 after the replacement of the board is recognized as a different multifunction peripheral 10 under the management based on key pairs, as in a case where the entire body of the multifunction peripheral 10 is replaced, because of the loss of the private key of the owner authentication keys that may prove that a pair is formed. In the following description, the multifunction peripheral 10 that lost the private key of the owner authentication keys is referred to as the "real device 10*c*", and the multifunction peripheral 10 to be assigned new owner authentication keys is referred to as the "real device 10*d*".

In the present exemplary embodiment, since it is assumed that the board of the real device 10*c* is replaced, the data to be synchronized that was retained by the real device 10*c* is handed over to the real device 10*d* without a change. If the apparatus body is replaced, the data to be synchronized that was retained by the real device 10*c* needs to be transferred to the real device 10*d* in advance.

The real device 10*c* is set up through maintenance operation so as to be operable as the real device 10*d*, but the real device 10*d* remains without the private key of the owner authentication keys. At this point, the synchronized pair still remains dissolved. Thus, the real device 10*d* needs to be paired again with a virtual device 20, which is to retain synchronized data.

As described above, the real device 10*c* and the real device 10*d* are depicted as different multifunction peripherals 10 in FIG. 3 for the convenience of description but substantially represent a single multifunction peripheral 10, and thus the multifunction peripheral 10 is assumed to be paired with a virtual device 20 again in the description. If a multifunction peripheral 10 is newly installed in the tenant, a new pair is formed.

Figure 4:
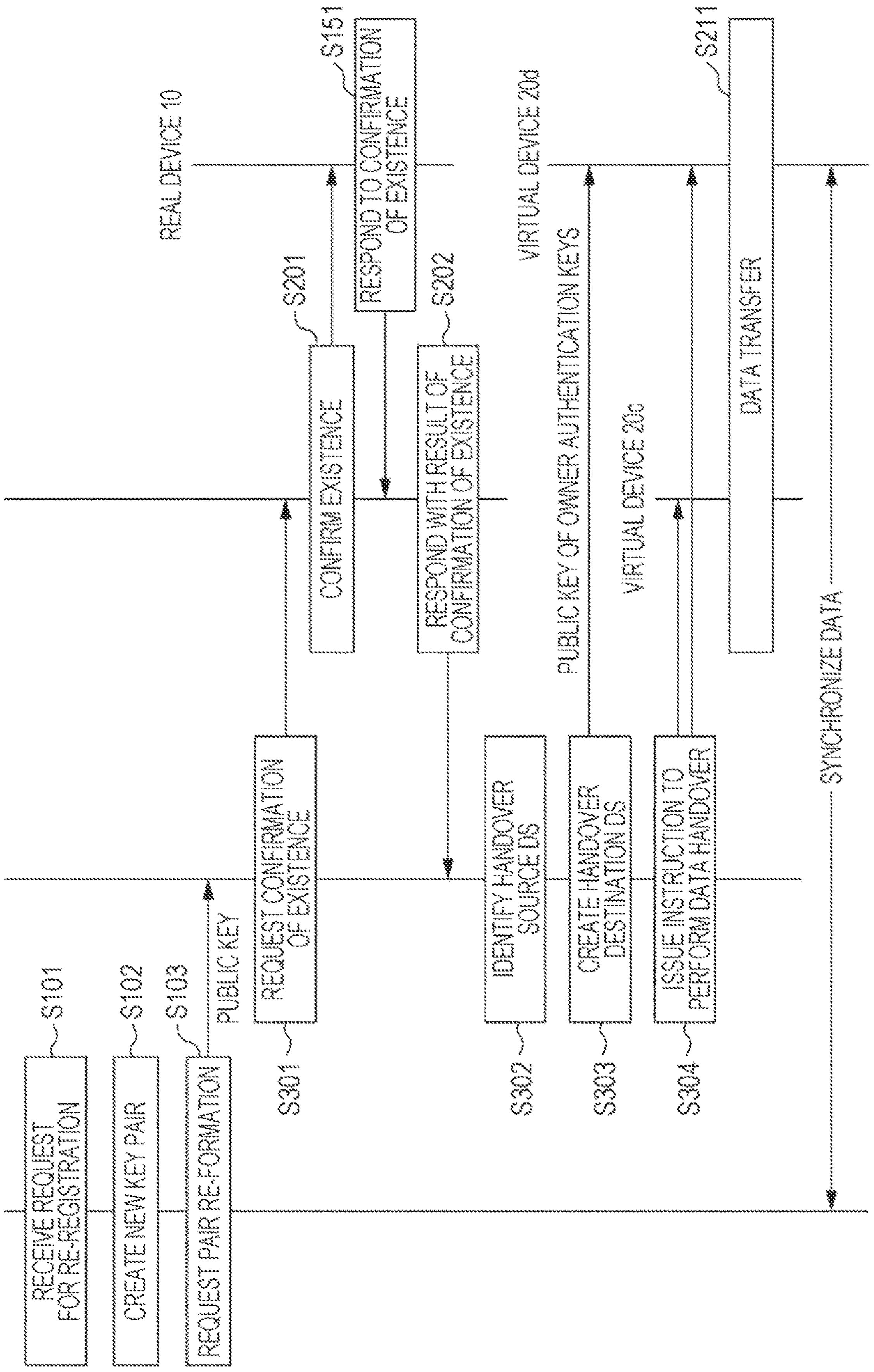
FIG. 4 is a sequence chart illustrating a process performed to re-form a pair having synchronized data according to the first exemplary embodiment.

Referring to a sequence chart depicted in FIG. 4, description will be given herein with regard to a process performed for the real device 10*d* to be paired again in the present exemplary embodiment. In FIG. 4, the virtual device 20 is sometimes denoted by the symbol "DS" for the convenience.

The administrator of the real device 10*d* performs a predetermined operation to request that the real device 10*d* again register a virtual device 20 to be synchronized and paired with the real device 10*d*.

If the real device 10*d* receives a request for re-registration from the administrator (step S101), the key manager 11 creates a new key pair, that is, owner authentication keys and registers the new key pair in the HSM of the board (step S102). The public key of the device authentication keys has been set in the HSM of a new board in advance. Subsequently, the request processor for pair re-formation 13 sends to the server 30 a request for pair re-formation including the public key of the owner authentication keys and the public key of the device authentication keys (step S103). Information is attached to the request for pair re-formation to distinguish the request from a request to form a new pair.

As described above, the real device 10*c* is referred to as the real device 10*d* in FIG. 3 after the board was replaced. Although, for the convenience of description, the real devices 10 before and after the replacement are denoted by different symbols ("10*c*" and "10*d*") for easy distinction, the real device 10*c* and the real device 10*d* are substantially the same multifunction peripheral 10, and it follows that the real device 10*c* requests that the server 30 re-form a pair. If the real device 10*d* is, for example, a new multifunction peripheral 10 and is different from the real device 10*c*, it follows that the request is a request to form a new pair as described above, and a virtual device 20*d* need not take over the data of the virtual device 20*c*.

Upon receiving the request for pair re-formation from the real device 10*d*, the request receiver for pair re-formation 33 of the server 30 authenticates the real device 10*d* using the public key of the device authentication keys and identifies the tenant 6 to which the real device 10*d* belongs. If the authentication is unsuccessful, the request receiver for pair re-formation 33 does not accept the request for pair re-formation. Subsequently, the confirmation-of-existence controller 34 requests that each of the virtual devices 20 belonging to the identified tenant 6 confirm the existence of the real device 10 paired with the virtual device 20 (step S301).

In response to the request from the server 30, the confirmation-of-existence controller 23 of each of the virtual devices 20 sends predetermined information for the confirmation of existence to the real device 10 paired with the virtual device 20 to confirm the existence (step S201). The term "existence" means herein that a device is present and may be synchronized regarding data. The virtual device 20 may confirm the existence of the real device 10 paired with the virtual device 20 by confirming that the real device 10 is connected to the network and may be synchronized regarding the data.

The confirmation-of-existence responder 14 of each of the real devices 10 receives the predetermined information for the confirmation of existence from the virtual device 20 that is paired with the real device 10 and responds by returning predetermined information indicating the existence (step S151).

The confirmation-of-existence controller 23 of each of the virtual devices 20 receives the response to the confirmation of existence from the real device 10 paired with the virtual device 20 and thus may confirm that the real device 10 paired with the virtual device 20 is present in a normal condition. In contrast, if the real device 10 paired with the virtual device 20 does not respond with the predetermined information, it follows that the real device 10 is not in a normal condition, that is, the existence is not confirmed. The confirmation-of-existence controller 23 responds to the server 30 with the result of confirmation of existence performed as above (step S202).

The confirmation-of-existence controller 34 of the server 30 receives and collects the results of confirmation of existence sent from all the virtual devices 20 in response to the request for the confirmation of existence.

Referring to FIG. 1, if the real devices 10*a*, 10*b*, and 10*c* that are paired with the virtual devices are present, the virtual devices 20*a*, 20*b*, and 20*c* are expected to be able to confirm the existence of the real devices 10*a*, 10*b*, and 10*c*, respectively. However, the real device 10*c* exists as the real device 10*d* as depicted in FIG. 3 because of the replacement of the board. In addition, the virtual device 20*c* does not retain the public key of the owner authentication keys retained by the real device 10*d*. Thus, the virtual device 20*c* is not able to confirm the existence of the real device 10*c*, in which a replaced board is installed, as well as the existence of the real device 10*d*.

Referring to the result of the confirmation of existence sent from each of the virtual devices 20, the confirmation-of-existence controller 34 may determine that the real devices 10*a* and 10*b* are present and that the real device 10*c* is not present. In other words, if the real device 10 that sent the request for pair re-formation is referred to as a "requester" and the virtual device 20 that was paired with the requester is referred to as an "immediately preceding pairing partner", the real device 10*d* corresponds to a "requester" because the real device 10*d* sent the request for pair re-formation as described above. Although the real device 10*c* is denoted by a symbol different from the symbol that denotes the real device 10*d*, the real device 10*c* is actually a multifunction peripheral 10 that is substantially the same as the real device 10*d* that sent the request for pair re-formation, and thus the real device 10*c* may corresponds to a "requester". The virtual device 20*c*, which was not able to confirm the existence of the real device 10*c* paired with the virtual device 20*c*, may corresponds to an "immediately preceding pairing partner". Namely, as described below, and as depicted in FIG. 3, the virtual device 20*d* is newly paired with the real device 10*d*, and a virtual device 20 that is newly paired with a requester in response to the request for pair re-formation is referred to as a "new pairing partner" in the present exemplary embodiment. In the present exemplary embodiment, the virtual device 20*d* corresponds to a "new pairing partner".

As described above, the confirmation-of-existence controller 34 identifies the virtual device 20*c* that was synchronized with the real device 10*c* as an immediately preceding pairing partner and as a handover source of the data to be synchronized (step S302).

Subsequently, the virtual-device manager 35 creates a virtual device 20*d* to be newly paired with the real device 10*d* (step S303), identifies the virtual device 20*d* as a new pairing partner as described above, and designates the virtual device 20*d* as a handover destination of the data to be synchronized that is received from the virtual device 20*c*.

Once the handover source and the handover destination of the data to be synchronized are determined as described above, the data-transfer controller 36 instructs the virtual device 20*c* and the virtual device 20*d* to perform data handover (step S304).

The data-transfer processor 24 of the virtual device 20*c* and the data-transfer processor 24 of the virtual device 20*d* operate in collaboration under the control by the data-transfer controller 36 and transfer to the virtual device 20*d* the data to be synchronized that is stored in the synchronized-data storage 26 of the virtual device 20*c*. This procedure allows the data, which is to be synchronized, to be saved to the synchronized-data storage 26 of the virtual device 20*d*.

As described above, data synchronized between the real device 10*c* and the virtual device 20*c* that were paired with each other is handed to the real device 10*d* and the virtual device 20*d* that are paired with each other.

Second Exemplary Embodiment

In the first exemplary embodiment, the virtual device 20*d* is newly created as a new pairing partner in response to the request for pair re-formation from the real device 10*d*, and the real device 10*d* and the virtual device 20*d* are paired with each other for synchronization instead of the real device 10*c* and the virtual device 20*c* that were paired with each other. In this way, the virtual device 20*d* is unconditionally created in response to the request for pair re-formation in the first exemplary embodiment, but the virtual device 20*d* need not necessarily be created. Specifically, the server 30 may pair the virtual device 20*c*, which already exists, with the real device 10*d*. Since the virtual device 20*c* that is the immediately preceding pairing partner already retains data to be synchronized, if the virtual device 20*c* is further used as the new pairing partner, the virtual device 20*d* need not newly be created, and further a process need not be performed to transfer between the virtual devices 20 data to be synchronized. In summary, the server 30 may select the immediately preceding pairing partner, that is, the virtual device 20*c* as the new pairing partner based on a predetermined condition.

The virtual device 20*c* described herein, which exists as the immediately preceding pairing partner, or the virtual device 20*d* described in the first exemplary embodiment, which is newly created, is selected as the new pairing partner. If the virtual device 20*c*, which already exists, is selected as the new pairing partner, the virtual-device manager 35 need not newly create the virtual device 20*d* and only needs to select the virtual device 20*c* as the new pairing partner and cause the virtual device 20*c* to retain and manage the public key of the owner authentication keys in step S303 depicted in FIG. 4. The data transfer process controlled by the data-transfer processor 24 (step S211) is unnecessary.

If the virtual device 20*c* is selected as the new pairing partner, the resource consumption necessary for newly creating the virtual device 20*d* in the cloud 2 is avoided. In addition, since the process of transferring data between synchronization targets is unnecessary, load, time, cost, and other burden that accompany the process of transferring data are avoided.

In contrast, if the virtual device 20*d* is newly created and selected as the new pairing partner, the virtual device 20*c* may be maintained for a predetermine period, and thus recovery is possible in case the real device 10*d* is not properly associated with the virtual device 20*d*.

As described above, based on a predetermined condition, the server 30 selects the virtual device 20*c* or the virtual device 20*d* as the new pairing partner that is to be newly paired with the real device 10*d* as the requester. Examples of the predetermined condition may include an operating environment and processing capability of the virtual device 20 and an instruction from the administrator of the real device 10*d*. More specifically, for example, if the amount of data to be transferred is equal to a predetermined threshold or larger, the virtual device 20*c* continues to be used to avoid transfer of a huge amount of data. Alternatively, the determination may be based on a thing to be replaced in the real device 10*c*, the reason for the replacement, or other factors. For example, if the extent of the replacement is limited to the replacement of the board, the virtual device 20*c* continues to be used, and if the multifunction peripheral 10 or the body is nearly entirely replaced, the virtual device 20*d* is newly created.

Third Exemplary Embodiment

In the first exemplary embodiment, the server 30 is configured to receive the result of confirmation of existence from each of the virtual devices 20 in response to the request for the confirmation of existence and identify as the immediately preceding pairing partner a virtual device 20 that failed to return the confirmation of existence among the multiple virtual devices 20 (steps S301 to S302 in FIG. 4). The virtual device 20*c* that was paired with the real device 10*c*, which has transformed into the real device 10*d* because of the replacement of the board as in the above examples, is permanently disconnected from the real device 10*c*, and the virtual device 20*c* is naturally unable to confirm the existence of the real device 10*c*.

However, for example, when a virtual device 20 tries to access a real device 10 paired with the virtual device 20 in response to the request for the confirmation of existence from the server 30, it is possible that the virtual device 20 is unable to confirm the existence of the real device 10, for example, because the virtual device 20 is designed to connect to the real device 10 as necessary only when synchronizing data or because the real device 10 is powered off or is under maintenance. In such cases, the server 30 receives multiple results of confirmation of existence indicating a failure to confirm existence and thus fails to uniquely identify a virtual device 20*c* that is to be the immediately preceding pairing partner.

Thus, the present exemplary embodiment is designed to handle a situation in which the result of confirmation of existence indicating a failure to confirm existence is received from multiple virtual devices 20 in response to the request for the confirmation of existence.

The block diagram of each of the devices 10, 20, and 30 may be the same in the present exemplary embodiment as in the first exemplary embodiment. A process performed for a real device 10 and a virtual device 20 to be paired with each other again for synchronization may also be the same as the process illustrated by the sequence chart depicted in FIG. 4. However, the details of the process for identifying the immediately preceding pairing partner in step S302 are different to some extent from the details of the process in the first exemplary embodiment because the process in the present exemplary embodiment is designed to handle a situation in which multiple results of confirmation of existence indicating a failure to confirm existence are received in response to the request for the confirmation of existence.

Specifically, when multiple results of confirmation of existence indicating a failure to confirm existence are received, the virtual-device manager 35 addresses an inquiry to the administrator of the real device 10*d* about feature information indicating the feature of the real device 10*d*, that is, the real device 10*c* as the requester. Since the real device 10*c* and the real device 10*d* are substantially the same multifunction peripheral 10, the administrators of these devices are the same. The inquiry may be displayed by the operation panel of the real device 10*d* as a predetermined message or may be sent to the terminal apparatus used by the administrator and may be displayed. The administrator of the real device 10 returns a piece of feature information indicating the feature of the real device 10*c* in response to the inquiry from the server 30.

The real device 10*d* is a multifunction peripheral 10 formed by the replacement of the board of the real device 10*c* as described above and thus substantially remains the same multifunction peripheral 10. Thus, the real device 10*d* and the real device 10*c* are basically equivalent, and it is highly probable that provided functions and the configurations of options to be connected to are identical. Thus, the administrator of the real device 10*d* provides the server 30 with information including hardware configurations of these kinds as a piece of feature information of the real device 10*c*. In addition, a piece of information, such as the date of purchase of the real device 10, that is unchanged after maintenance operation including the replacement of the board may be used as the piece of feature information.

Before or after addressing the inquiry to the real device 10*d*, the server 30 also acquires, from each of the virtual devices 20 (hereinafter, referred to as a "candidate for the immediately preceding pairing partner) that returned to the server 30 a result of confirmation of existence indicating a failure to confirm existence, a piece of feature information that indicates the feature of a real device 10 and that is retained by the virtual device 20, as a piece of pairing-partner feature information.

Upon receiving the piece of feature information from the real device 10*d*, the server 30 compares the piece of feature information with the piece of pairing-partner feature information acquired from each of the candidates for the immediately preceding pairing partner. As described above, it is highly probable that the piece of feature information acquired from the real device 10*d* substantially coincides with the piece of pairing-partner feature information acquired from the virtual device 20*c* that was paired with the real device 10*c*. Thus, the virtual-device manager 35 may identify the virtual device 20*c* as the immediately preceding pairing partner.

Since the real devices 10*a*, 10*b*, and 10*c* belong to the same tenant, it is possible that similar types of apparatuses have been selected, and thus the comparison with the piece of feature information described above alone may be insufficient to reliably identify the piece of pairing-partner feature information.

In such a case, the confirmation-of-existence controller 34 may instruct the candidates for the immediately preceding pairing partner to confirm existence again. At this time, if each of the candidates for the immediately preceding pairing partner is not connected to a corresponding real device 10 paired with the candidate for the immediately preceding pairing partner, the candidate for the immediately preceding pairing partner is caused to forcibly connect to the real device 10 to confirm existence. This procedure may narrow down the candidates for the immediately preceding pairing partner to fewer candidates than simply performing the confirmation of existence as in step S301.

It is still possible that the candidates for the immediately preceding pairing partner are not narrowed down to a single device. The virtual-device manager 35 may address an inquiry to the administrator of the real device 10*d*, who was also the administrator of the real device 10*c*, about the virtual device 20 that was paired with the real device 10*c*. When addressing the inquiry to the administrator, the virtual-device manager 35 may send and present to the administrator the piece of pairing-partner feature information acquired from each of the candidates for the immediately preceding pairing partner as described above. The administrator may more easily select the immediately preceding pairing partner from the candidates for the immediately preceding pairing partner by referencing the piece of pairing-partner feature information that was sent.

In the present exemplary embodiment, considering time and effort of the administrator, an inquiry is addressed to the administrator only when the piece of feature information alone does not allow the selection of the immediately preceding pairing partner from the candidates for the immediately preceding pairing partner, but an inquiry may be addressed to the administrator when multiple candidates for the immediately preceding pairing partner are identified.

According to the present exemplary embodiment, when multiple candidates for the immediately preceding pairing partner are found through the confirmation of existence, the virtual device 20 corresponding to the immediately preceding pairing partner may be selected more properly.

In each of the exemplary embodiments described above, the first information processing apparatus and the second information processing apparatus are described as a multifunction peripheral, for example, but may be an apparatus, such as a printer, that is different from a multifunction peripheral, an information processing apparatus, such as a personal computer (PC), that needs to synchronize data, or an apparatus equipped with such an information processing apparatus.

Processes described in the exemplary embodiments 1 to 3 may be performed in an appropriately combined form, as necessary.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing system comprising:

a processor configured to manage a plurality of second information processing apparatuses to be paired with a first information processing apparatus retaining data, the plurality of second information processing apparatuses retaining data synchronized with the data retained by the first information processing apparatus, wherein the processor is configured to:

in response to a request for pair re-formation from the first information processing apparatus that has ceased to be paired with one of the plurality of second information processing apparatuses, request that each of the plurality of second information processing apparatuses perform confirmation of existence of the first information processing apparatus paired with the second information processing apparatus;

receive a result of the confirmation of existence returned by each of the plurality of second information processing apparatuses in response to the request for the confirmation of existence; and if the first information processing apparatus that made the request for pair re-formation is referred to as a requester and the second information processing apparatus that was paired with the requester is referred to as an immediately preceding pairing partner, reference the received results of the confirmation of existence and identify, as the immediately preceding pairing partner, the second information processing apparatus that has failed to confirm existence of the first information processing apparatus paired with the second information apparatus.

(((2)))

The information processing system according to (((1))), wherein the processor is configured to, in accordance with a predetermined condition, select as a new pairing partner one of the plurality of second information processing apparatuses to be newly paired with the requester.

(((3)))

The information processing system according to (((2))), wherein the processor is configured to, if one of the plurality of second information processing apparatuses that is different from the immediately preceding pairing partner is selected as the new pairing partner, transfer the data retained by the immediately preceding pairing partner to the new pairing partner.

(((4)))

The information processing system according to (((2))), wherein the processor is configured to select the immediately preceding pairing partner as the new pairing partner.

(((5)))

The information processing system according to any one of (((1))) to (((4))), wherein the processor is configured to, when having received a plurality of results of the confirmation of existence indicating a failure to confirm existence, by referencing a piece of feature information indicating a feature of the requester or by contacting an administrator of the requester for information, select the immediately preceding pairing partner from the plurality of second information processing apparatuses having sent the respective results of the confirmation of existence indicating a failure to confirm existence.

(((6)))

The information processing system according to (((5))), wherein the processor is configured to:

when referencing the piece of feature information, acquire the piece of feature information by requesting the piece of feature information from the requester; and select the immediately preceding pairing partner based on a result of comparing the acquired piece of feature information with a piece of pairing-partner feature information retained by each of the plurality of second information processing apparatuses that have sent the respective results of the confirmation of existence indicating a failure to confirm existence, the piece of pairing-partner feature information indicating a feature of the first information processing apparatus paired with the second information processing apparatus.

(((7)))

The information processing system according to (((5))), wherein the processor is configured to:

when contacting the administrator for information, acquire, from each of the plurality of second information processing apparatuses that have sent the respective results of the confirmation of existence indicating a failure to confirm existence, a corresponding piece of pairing-partner feature information indicating a feature of the first information processing apparatus paired with the second information processing apparatus; and present the administrator of the requester the plurality of acquired piece of pairing-partner feature information.

(((8)))

The information processing system according to any one of (((1))) to (((7))), wherein the plurality of second information processing apparatuses are formed in a cloud.

(((9)))

The information processing system according to any one of (((1))) to (((8))), wherein a pair of pieces of information is provided to prove that the first information processing apparatus is paired with one of the plurality of second information processing apparatuses, the first information processing apparatus retains one of the pair of pieces of information, and the second information processing apparatus retains the other of the pair of pieces of information.

(((10)))

A program causing a computer to execute a process, the computer being configured to manage a plurality of second information processing apparatuses to be paired with a first information processing apparatus retaining data, the plurality of second information processing apparatuses retaining data synchronized with the data retained by the first information processing apparatus, the process comprising:

in response to a request for pair re-formation from the first information processing apparatus that has ceased to be paired with one of the plurality of second information processing apparatuses, requesting that each of the plurality of second information processing apparatuses perform confirmation of existence of the first information processing apparatus paired with the second information processing apparatus;

receiving a result of the confirmation of existence returned by each of the plurality of second information processing apparatuses in response to the request for the confirmation of existence; and if the first information processing apparatus that made the request for pair re-formation is referred to as a requester and the second information processing apparatus that was paired with the requester is referred to as an immediately preceding pairing partner, referencing the received results of the confirmation of existence and identifying, as the immediately preceding pairing partner, the second information processing apparatus that has failed to confirm existence of the first information processing apparatus paired with the second information apparatus.

What is claimed is:

1. An information processing system comprising:

a processor configured to manage a plurality of second information processing apparatuses to be paired with a first information processing apparatus retaining data, the plurality of second information processing apparatuses retaining data synchronized with the data retained by the first information processing apparatus, wherein the processor is configured to:

in response to a request for pair re-formation from the first information processing apparatus that has ceased to be paired with one of the plurality of second information processing apparatuses, request that each of the plurality of second information processing apparatuses perform confirmation of existence of the first information processing apparatus paired with the second information processing apparatus;

receive a result of the confirmation of existence returned by each of the plurality of second information processing apparatuses in response to the request for the confirmation of existence; and if the first information processing apparatus that made the request for pair re-formation is referred to as a requester and the second information processing apparatus that was paired with the requester is referred to as an immediately preceding pairing partner, reference the received results of the confirmation of existence and identify, as the immediately preceding pairing partner, the second information processing apparatus that has failed to confirm existence of the first information processing apparatus paired with the second information apparatus.

2. The information processing system according to claim 1, wherein the processor is configured to, in accordance with a predetermined condition, select as a new pairing partner one of the plurality of second information processing apparatuses to be newly paired with the requester.

3. The information processing system according to claim 2, wherein the processor is configured to, if one of the plurality of second information processing apparatuses that is different from the immediately preceding pairing partner is selected as the new pairing partner, transfer the data retained by the immediately preceding pairing partner to the new pairing partner.

4. The information processing system according to claim 2, wherein the processor is configured to select the immediately preceding pairing partner as the new pairing partner.

5. The information processing system according to claim 1, wherein the processor is configured to, when having received a plurality of results of the confirmation of existence indicating a failure to confirm existence, by referencing a piece of feature information indicating a feature of the requester or by contacting an administrator of the requester for information, select the immediately preceding pairing partner from the plurality of second information processing apparatuses having sent the respective results of the confirmation of existence indicating a failure to confirm existence.

6. The information processing system according to claim 5, wherein the processor is configured to:

when referencing the piece of feature information, acquire the piece of feature information by requesting the piece of feature information from the requester; and select the immediately preceding pairing partner based on a result of comparing the acquired piece of feature information with a piece of pairing-partner feature information retained by each of the plurality of second information processing apparatuses that have sent the respective results of the confirmation of existence indicating a failure to confirm existence, the piece of pairing-partner feature information indicating a feature of the first information processing apparatus paired with the second information processing apparatus.

7. The information processing system according to claim 5, wherein the processor is configured to:

when contacting the administrator for information, acquire, from each of the plurality of second information processing apparatuses that have sent the respective results of the confirmation of existence indicating a failure to confirm existence, a corresponding piece of pairing-partner feature information indicating a feature of the first information processing apparatus paired with the second information processing apparatus; and present the administrator of the requester the plurality of acquired piece of pairing-partner feature information.

8. The information processing system according to claim 1, wherein the plurality of second information processing apparatuses are formed in a cloud.

9. The information processing system according to claim 1, wherein a pair of pieces of information is provided to prove that the first information processing apparatus is paired with one of the plurality of second information processing apparatuses, the first information processing apparatus retains one of the pair of pieces of information, and the second information processing apparatus retains the other of the pair of pieces of information.

10. A non-transitory computer readable medium storing a program causing a computer to execute a process, the computer being configured to manage a plurality of second information processing apparatuses to be paired with a first information processing apparatus retaining data, the plurality of second information processing apparatuses retaining data synchronized with the data retained by the first information processing apparatus, the process comprising:

in response to a request for pair re-formation from the first information processing apparatus that has ceased to be paired with one of the plurality of second information processing apparatuses, requesting that each of the plurality of second information processing apparatuses perform confirmation of existence of the first information processing apparatus paired with the second information processing apparatus;

receiving a result of the confirmation of existence returned by each of the plurality of second information processing apparatuses in response to the request for the confirmation of existence; and if the first information processing apparatus that made the request for pair re-formation is referred to as a requester and the second information processing apparatus that was paired with the requester is referred to as an immediately preceding pairing partner, referencing the received results of the confirmation of existence and identifying, as the immediately preceding pairing partner, the second information processing apparatus that has failed to confirm existence of the first information processing apparatus paired with the second information apparatus.

11. An information processing method for causing a computer to execute a process, the computer being configured to manage a plurality of second information processing apparatuses to be paired with a first information processing apparatus retaining data, the plurality of second information processing apparatuses retaining data synchronized with the data retained by the first information processing apparatus, the process comprising:

in response to a request for pair re-formation from the first information processing apparatus that has ceased to be paired with one of the plurality of second information processing apparatuses, requesting that each of the plurality of second information processing apparatuses perform confirmation of existence of the first information processing apparatus paired with the second information processing apparatus;

receiving a result of the confirmation of existence returned by each of the plurality of second information processing apparatuses in response to the request for the confirmation of existence; and if the first information processing apparatus that made the request for pair re-formation is referred to as a requester and the second information processing apparatus that was paired with the requester is referred to as an immediately preceding pairing partner, referencing the received results of the confirmation of existence and identifying, as the immediately preceding pairing partner, the second information processing apparatus that has failed to confirm existence of the first information processing apparatus paired with the second information apparatus.

* * * * *